United States Patent
Coffey et al.

(10) Patent No.: US 6,543,479 B2
(45) Date of Patent: Apr. 8, 2003

(54) WATER MONITORING SYSTEM

(75) Inventors: John B. Coffey, Englewood, FL (US);
Walter G. Kaiser, Port Charlotte, FL (US)

(73) Assignee: Flood Knot, Inc., Port Charlotte, FL (US)

( * ) Notice: Subject to any disclaimer, the term of this patent is extended or adjusted under 35 U.S.C. 154(b) by 0 days.

(21) Appl. No.: 10/122,525

(22) Filed: Apr. 15, 2002

(65) Prior Publication Data

US 2002/0148515 A1 Oct. 17, 2002

Related U.S. Application Data

(60) Provisional application No. 60/283,569, filed on Apr. 13, 2001.

(51) Int. Cl.[7] .................................................. E03C 1/02
(52) U.S. Cl. .................................. 137/624.11; 137/459
(58) Field of Search ....................... 137/624.11, 624.12, 137/312, 456, 459, 460; 251/129.04

(56) References Cited

U.S. PATENT DOCUMENTS 4,735,231 A * 4/1988 Jacquet .............. 137/624.12 X
5,004,014 A * 4/1991 Bender .................. 137/624.12
5,921,280 A * 7/1999 Ericksen et al. ....... 137/624.11
6,105,607 A * 8/2000 Caise et al. ......... 137/624.12 X

* cited by examiner

Primary Examiner—Kevin Lee
(74) Attorney, Agent, or Firm—Gifford, Krass, Groh, Sprinkle, Anderson & Citkowski

(57) ABSTRACT

A water monitoring and control system adapted for residential and commercial use automatically shuts off the water supply after a predetermined period of time, whether the flow is intentional or unintentional, thereby preventing damage from leaks and other malfunctions. The system also gives an indication of all water flow ranging from normal usage to leakage of a few drops and large flow, as would typically occur due to a break in the plumbing system. The system is easily bypassed in the event of power outages. In terms of hardware, the main components of the system include a normally closed water shut-off valve, preferably solenoid-operated. A pressure-responsive switch senses changes in water pressure and sends a signal in the event of a pressure drop, and a timer is provided to start a timing cycle when there is a demand for water, either intentional or unintentional, and shut-off the flow after a predetermined period of time selected by the user. The system also preferably incorporates a water demand indicator used to visually indicate water usage in the system, again, whether it is intentional or unintentional.

18 Claims, 4 Drawing Sheets

WATER MONITORING SYSTEM

REFERENCE TO RELATED APPLICATION

This application claims priority from U.S. provisional Patent Application Serial No. 60/283,569, filed Apr. 13, 2001, the entire contents of which being incorporated herein by reference.

FIELD OF THE INVENTION

This invention relates generally to plumbing systems and, in particular, to a water monitoring system that closes off the supply line and performs other functions in the event a flow occurs longer than a predetermined period of time.

BACKGROUND OF THE INVENTION

It is important to prevent water damage in plumbing systems, which are often caused by leaks that occur in the system. Particularly in the absence of occupants, if such leaks are not detected early enough extensive damage may occur.

There are a variety of water flow control systems which shut off automatically in the event of any leakage. But existing systems of this kind tend to be extremely complex, costly, and difficult to install.

Accordingly, there remains a need for a simple water monitoring and control system adapted for use with residential and commercial building water systems. Ideally such a system would provide notice of all water flow, both intentional and unintentional, and keeps unintentional flow to a minimum, thereby reducing damage to the structure supplied by the system.

SUMMARY OF THE INVENTION

This invention improves upon the existing art by providing a water monitoring and control system capable of protecting both homes and businesses. Among other operations, the system automatically shuts off the water supply after a predetermined period of time, whether the flow is intentional or unintentional, thereby preventing damage from leaks and other malfunctions.

The system also gives an indication of all water flow ranging from normal usage to leakage of a few drops and large flow, as would typically occur due to a break in the plumbing system. The system is easily bypassed in the event of power outages.

In terms of hardware, the main components of the system include a normally closed water shut-off valve, preferably solenoid-operated. A pressure-responsive switch senses changes in water pressure and sends a signal in the event of a pressure drop, and a timer is provided to start a timing cycle when there is a demand for water, either intentional or unintentional, and shut-off the flow after a predetermined period of time selected by the user. The system also preferably incorporates a water demand indicator used to visually indicate water usage in the system, again, whether it is intentional or unintentional.

DETAILED DESCRIPTION OF THE INVENTION

Figure 1:
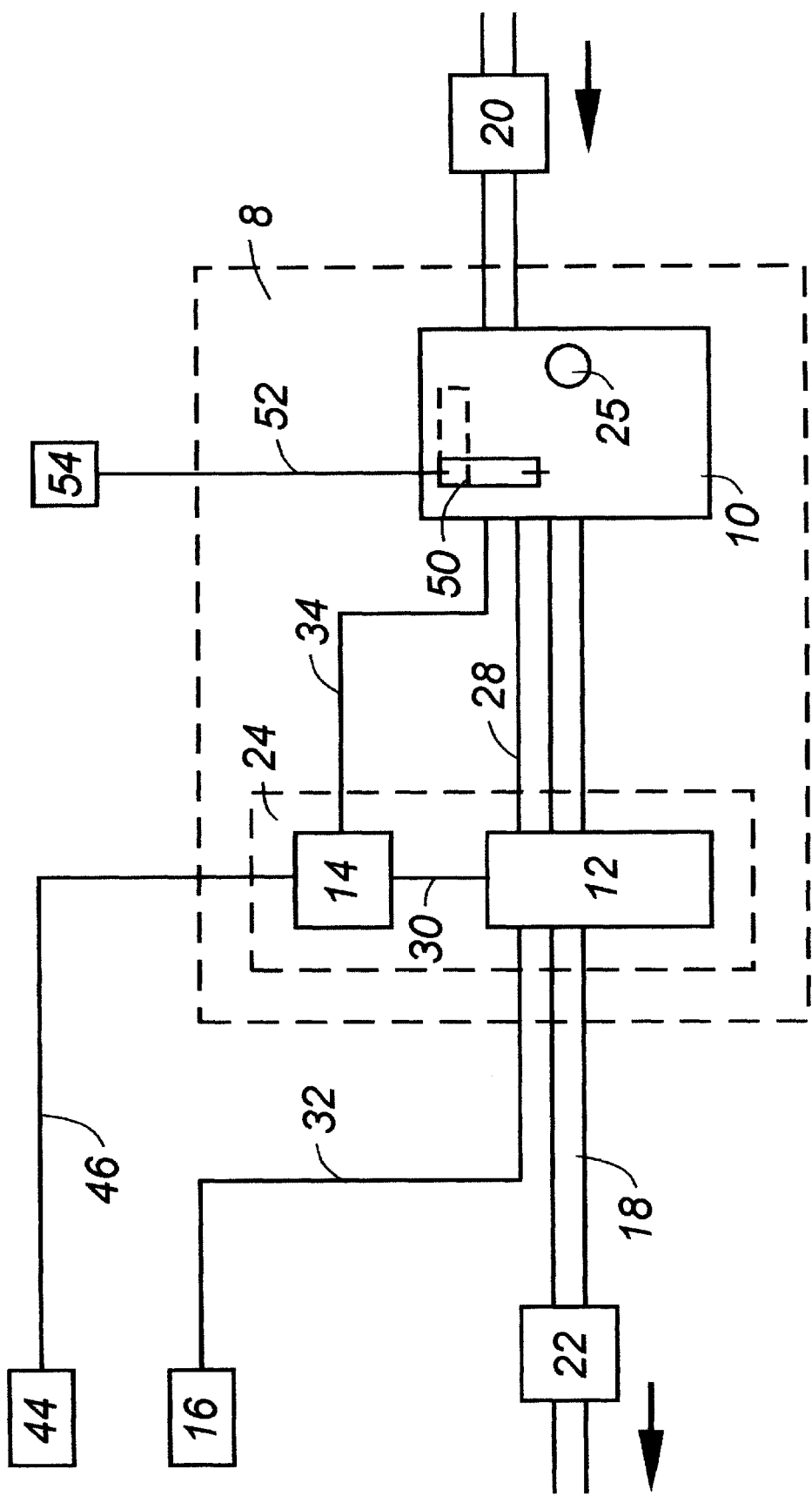
FIG. 1 is a diagrammatic view of a water monitoring and control system embodying the invention showing the various components.

Reference is now made to the figures, wherein a water monitoring and control system embodying the invention is designated generally at 8. It will be appreciated that while copious references are made herein to "water," the system applicable to any type of liquid or fluid.

The principle components of the system 8 include a normally closed, solenoid-operated valve 10, a pressure responsive switch 12, a timer 14 and a water demand indicator 16. The solenoid valve 10 and pressure switch 12 are installed in the water line 18 supplying water to buildings such as a residence, and are typically disposed between a main, manually operated valve 20 and a first point of water demand of the water plumbing system in the building, such as a valve indicated at 22.

Typically, the solenoid-operated valve 10 is installed at the exterior of the building near the main shut off valve 20. The pressure switch 12 and timer 14 are located in a control box designated in broken line at 24. The control box 24 can be located adjacent to the solenoid valve 10, or other location in the water line 18 before the point at which water is demanded for the first time in the system such as the water demand valve 22.

Figure 2:
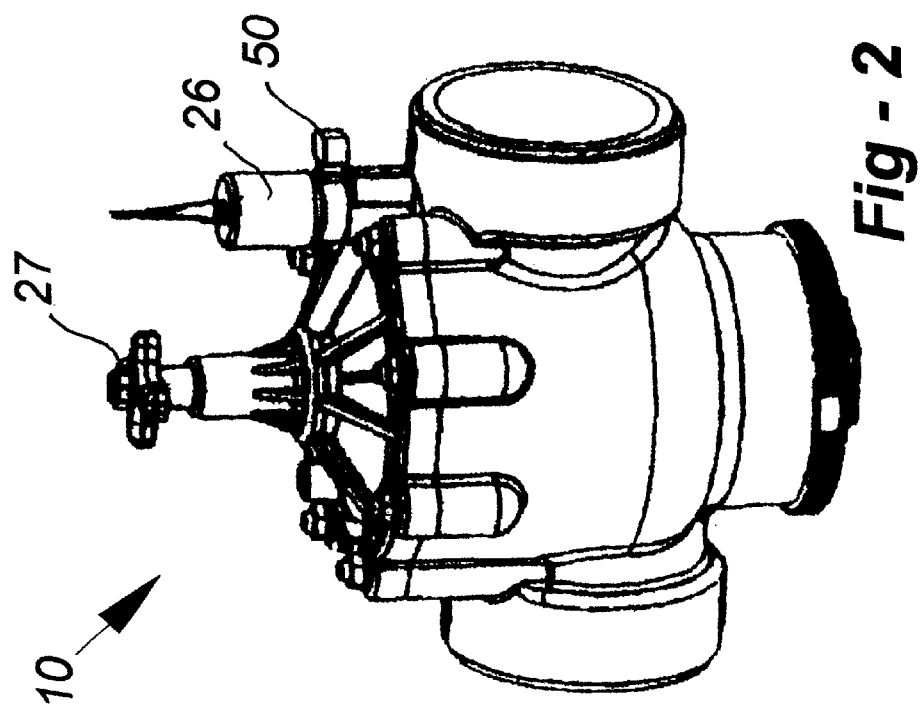
FIG. 2 is a perspective view of a solenoid valve forming one of the principal components of the monitoring system.

A suitable normally closed valve 10 may be obtained from Irritrol Systems of Riverside, Calif. and is identified as model 100PT. The preferred valve 10 uses a solenoid 26 as shown in FIG. 2, operating on DC supply such as 24 volts to open the valve 10 to water flow. Provision is made for operation of the valve 10 either manually or electrically by means of solenoid. A manual control 27 is provided to open and set the downstream water pressure.

The pressure switch 12 employed in the system is available from Square D Company and is identified as pressure switch 9013FSG2. The pressure switch 12 employs a diaphragm arrangement to detect a reduction in water pressure and acts to close electric contacts that energize and completes an electrical circuit 28 which is connected to the solenoid of the main control valve 10. A circuit 30 is connected to the timer 14 and the circuit 32 communicates with the water-demand indicator 16.

The characteristics of the pressure switch 12 are such that its range of operation can be selected so that the switch opens when the water pressure attains a pre-selected pressure and closes when the pressure drops below the pre-selected amount. The switch acts in response to a diaphragm which upon a reduction of water pressure moves downwardly to allow the contacts of an electric switch to come in contact with each other and close the switch.

Figure 3:
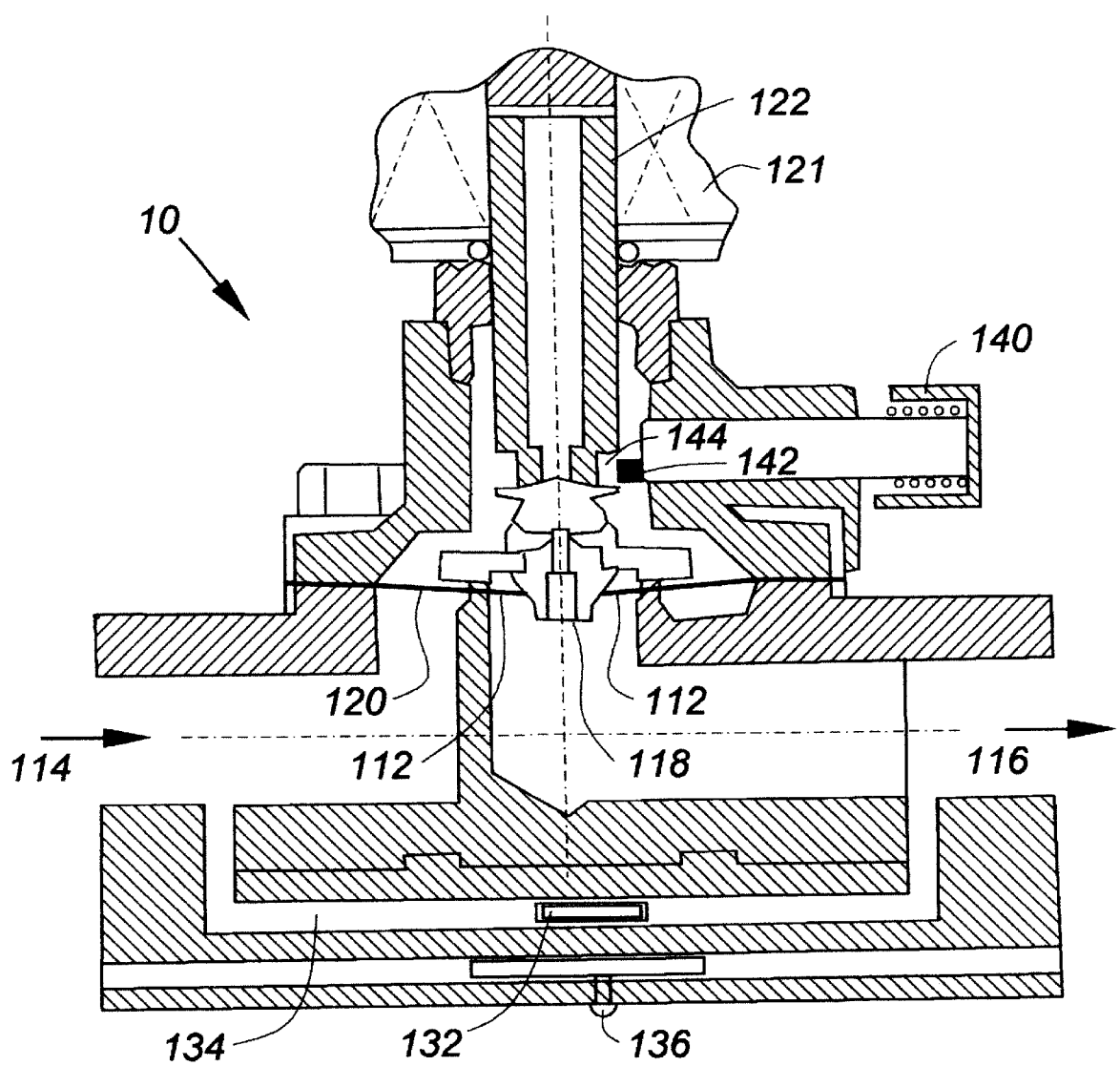
FIG. 3 is a drawing which shows a differential switch that may be used according to the invention across the primary supply shut-off valve.

As an alternative to pressure switch 12 located on one side of the valve 10, a differential pressure switch may be interconnected across the valve 10, to address problems which might be caused by typical pressure fluctuations in the supply line. Such a differential pressure switch may be implemented in a number of ways, including the use of a magnetic read-switch arrangement, depicted in FIG. 3. In such a case, the solenoid 121 is controlled by a reed switch 130 which opens and closes in response to the movement of a magnetic piston 132 slidably disposed in a branch passage 134 between the inlet 114 and outlet 116 of the main flow-control switch 10. Movement of the piston 132 in response to a pressure differential deflects the reed switch 130 and closes contacts to actuate the system. The sensitivity of the reed switch 130 may be regulated in a preferred range such as 5–10 psi, more or less, by way of an adjusting screw 136.

In the event of power failure, the valve 10 can be opened by a control plunger 140 which is pushed and turned 180 degrees to manually lift the solenoid core and open the valve 110. The end of plunger 140 is provided with an offset prong 142 that engages a recess 144 in the solenoid core. When the power is restored, the solenoid moves to its top position and releases the prong 142 so that the plunger 140 returns to its original position.

The timer 14 employed in the present system is obtainable from Danaher Controls of Gurney, Ill. In an actual embodiment of the invention, the model used was Eagle Signal 702070-001, Series B856. The characteristics of the timer are such that on actuation when water pressure drops and valve 10 opens, the timer starts at 0 and continues for a pre-selected time interval. At the end of the pre-selected time, the timer switch causes the control valve 10 to close, thereby preventing further water flow until it is reset. This may be done manually or, if the water pressure returns to normal prior to the end of the pre-selected period of time, it is automatically reset.

The water demand indicator 16 can be in the form of a light connected to pressure switch 12 by way of circuit 36. The indicator provides a visual signal anytime the pressure switch 12 drops below its predetermined selected value to indicate a water flow of any kind, intentional or unintentional.

Operation

Assuming a fully pressurized system, the solenoid valve 10 will be in a closed position, and the pressure switch 12 will be at full pressure. The water demand indicator will not be activated, and the timer will be reset to 0.

Upon a water demand, for example, by opening of the valve indicated at 22, the pressure switch 12 will detect a drop in water pressure and its internal switch will activate circuits 28, 30 and 32. This causes the solenoid actuated valve 10 to open to permit water flow, the timer 14 to be energized and start its preset time interval and the water demand indicator 16 to indicate water flow.

If the demand for water ends within the pre-selected time period, the water pressure will increase in the line 18, and the pressure switch 12 will close the main valve 10, causing the timer 14 to reset to 0. At the same time, the water demand indicator will deactivate. If, on the other hand, the water demand exceeds the preset, predetermined time span, the timer 14 will activate circuit 34 to the valve 10, causing it to close and terminate water flow. This occurs whether or not the water demand is intentional or unintentional. As a consequence, the period of the timer should be set to accommodate the expected usual water usage of the system. For example, based upon the amount of time a person uses to take a shower or water the lawn, or the length of time required for an automatic clothes washer or dishwasher, a period of a half hour or thereabouts might be appropriate.

Since the timer switch 14 terminates the flow of water if a pressure drop remains at the end of the preset time period regardless of whether the water demand is intentional or unintentional, the switch must be manually reset if the demand was intentional. For this purpose, a remote timer reset control 44 can be located at one or more convenient locations within the building and each connected by way of a circuit 46 to timer 14. If desired, the timer reset control 44 can be a wireless unit eliminating the need for the electric circuits 46. Such wireless control switches are available from Heath Company and is identified as Heath Zenith Model SL-6150. One or more of such reset controls can be located in convenient locations throughout the building such as the bathroom, kitchen, laundry room, and so forth, in the event it is found necessary to extend the period of time of the timer 14 to accommodate such functions as showers or lawn sprinkling systems.

Figure 4:
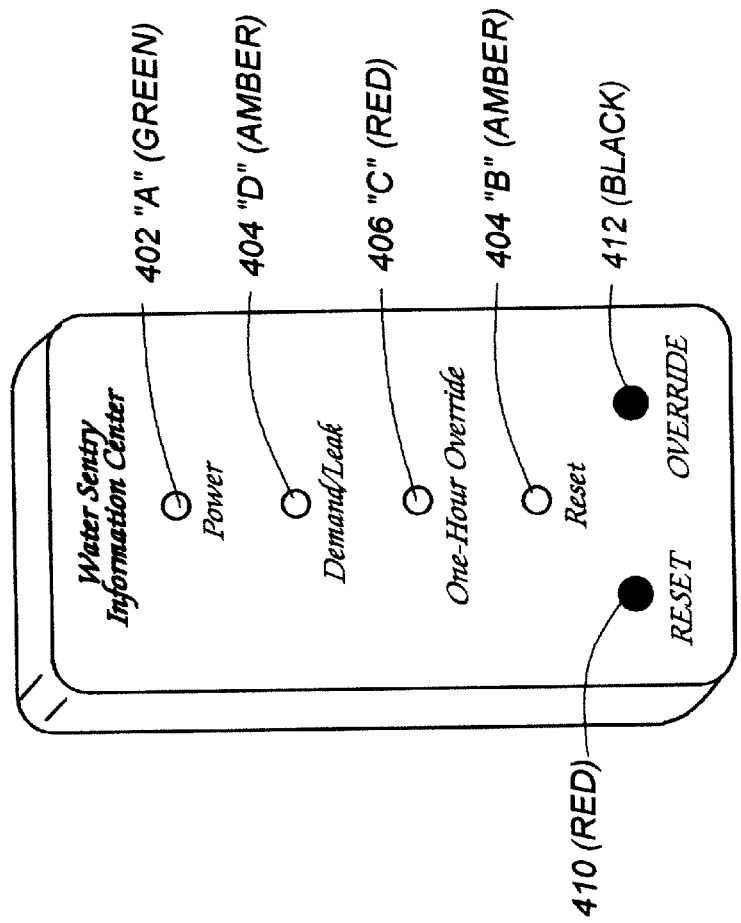
FIG. 4 is a drawing which shows an information center associated with the invention.
Figure 5:
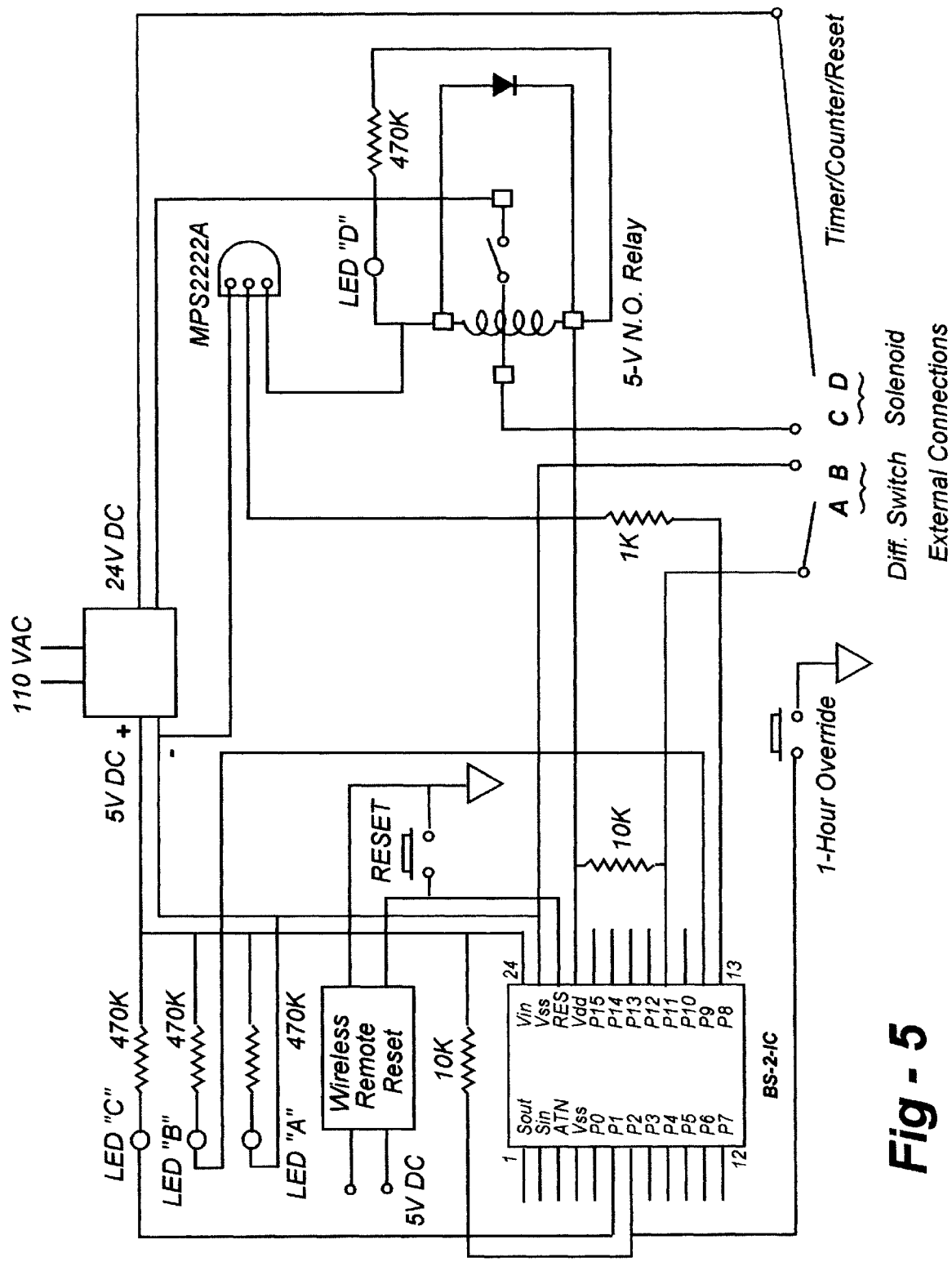
FIG. 5 is a schematic/block diagram indicating important electrical components associated with the timer, controller, reset and drive functions.

FIG. 4 is a drawing which shows an information center associated with a preferred embodiment of the invention, and FIG. 5 is a schematic/block diagram of the electronics associated with the timer, counter and reset functions. As shown in FIG. 4, the information center includes a plurality of indicators, including a green LED 402 which indicates that power is on, and an amber LED 404 which indicates the flow of water, either intention or unintentional. A third LED 406 is illuminated when button 412 is pressed to initiate a pre-timed override, in this case 1 hour, and an amber LED 408 illuminates when the system has shut the water off, requiring a manual reset which may be activated through button 410.

As shown in FIG. 5, an single integrated circuit, in this case, the BS-2 controller which includes a PIC microprocessor by Microchip Company. The device has 16 I/O lines (P0-P16), which can be used as digital inputs or outputs, and is preprogrammed with a basic interpreter for ease of encoding. The inputs and outputs of the circuit are used a shown, with some going to the various switches, and others driving the indicator lamps. A wireless remote reset, and local reset button, feed into pin 22, and reset the circuit. To assist with drive capabilities, an MPS222A transistor is used, making direct connection to a 5 volt supply from a transformer power supply to the differential switch through external connections A–D. The solenoid, making specific connection through points C and D, utilizes a 24 volt signal directly from the transformer power supply.

Even very small leaks in the water system will cause a drop in the water pressure to activate the pressure switch 12. As soon as this occurs, valve 10 will open momentarily to instantly re-establish pressure in the system and the water demand indicator will be activated and immediately deactivated as the water pressure repeatedly drops and is re-established in the system. The short cycles cause a flashing of the water demand indicator 16 giving notice that there is an unintentional water flow or a leak so that inspection can be made for repair. If the leak is of a sufficient magnitude, such as a steady stream, the timer will become activated and continue through its cycle to close off valve 10 and stop all water flow.

If the leak is rather small, such as a few drops per second, the preferred embodiment of the system counts the time intervals from the closing of the switch to the next closing of the switch. For example, if the leak is such that it takes a few seconds, or less than minute, or thereabouts, to "bleed" down to the next switch closing, the system according to this embodiment will memorize the time interval associated with the system. If the leak remains constant, the time interval will be similar to the previously detected time interval. Assuming that each time interval is within a preset range of the previous one, such as a few seconds, or thereabouts, the system according to this embodiment will count the number of such intervals, and shut off the water, requiring the system be reset manually if the count of such intervals reaches a preset number, such as 30, with the understanding that this number as well as the similarity between time intervals is fully adjustable according to the invention.

In the event of an electric power outage, valve 10 remains in its closed position to prevent water flow. The monitoring system can be bypassed manually by movement of the bypass lever 50 forming part of valve 10 to a bypass position indicated in broken line in FIG. 1. This will permit water flow in the system. At the time the manual bypass valve 50 is moved to its bypass position to permit water flow, a switch in a circuit 52 seen in FIG. 1 to an audible alarm 54 is closed or the bypass position will reset to normal when power is restored (see FIG. 3). When electric power is restored, the audible alarm will be activated to indicate that the manual bypass valve 50 is open so that the manual bypass valve 50 can be reset to its original position to permit the system to function automatically.

In summary, a water monitoring system and automatic control for such systems has been described in which a normally closed solenoid operated valve is activated to its open position each time there is a demand for water, either intentional or unintentional. A timer is used to permit flow for periods necessary for usual water demand purposes and if such periods are exceeded, the valve automatically closes to shut off the water supply. This serves to prevent excessive damage in the event of a burst water pipe line. All water flow is indicated by a steady visual signal, and small leaks are made known by a flashing signal.

We claim:

1. A water monitoring and control system adapted for use with a supply line from a water source to user location, the system comprising:

an electrically operated water shut-off valve located in the supply line;

a pressure sensor located in the supply line to detect a drop in water pressure;

a controller/timer interfaced to the pressure sensor and the electrically operated water shut-off valve, the controller/timer being operative to terminate the flow of water to the user location in the event that a in pressure is detected for longer than a predetermined period of time; and an override user control operative to extend the predetermined period of time to a predetermined override period of time in advance of an intended usage.

2. The water monitoring and control system according to claim 1, wherein the water shut-off valve is a normally closed valve operative to terminate water flow in the event of a power outage.

3. The water monitoring and control system according to claim 2, wherein the normally closed valve is solenoid-operated.

4. The water monitoring and control system according to claim 1, further including a timer reset user control operative to reset the timer and reestablish the flow of water through the water shut-off valve in the event that water usage beyond the preset period of time is intentional.

5. The water monitoring and control system according to claim 4, wherein the user reset control is remotely activated through a wireless communication.

6. The water monitoring and control system according to claim 1, wherein the pressure sensor is disposed at a point between the water shut-off valve and the user location.

7. The water monitoring and control system according to claim 1, wherein the pressure sensor is a differential sensor disposed across the water shut-off valve.

8. The water monitoring and control system according to claim 1, further including a memory for storing the period between the consecutive usages and wherein the controller/timer is further operative to terminate the flow of water in the event that a predetermined number of substantially equally spaced consecutive usages are detected.

9. The water monitoring and control system according to claim 1, further including a water demand indicator interfaced to the pressure sensor which indicates that a pressure drop and flow of water past the water shut-off valve has occurred.

10. The water monitoring and control system according to claim 9, further including a control center including the water demand indicator and a manually operated system reset function.

11. The water monitoring and control system according to claim 1, further including a memory for storing the period between the consecutive usages and wherein the controller/timer is further operative to terminate the flow of water in the event that a predetermined number of substantially equally spaced consecutive usages are detected.

12. The water monitoring and control system according to claim 1, wherein the user control center further includes a water demand indicator interfaced to the pressure sensor which indicates that a pressure drop and flow of water past the water shut-off valve has occurred.

13. A water monitoring and control system adapted for use with a supply line from a water source to user location, the system comprising:

an electrically operated, normally closed solenoid valve located in the supply line;

a pressure sensor located in the supply line to detect a drop in water pressure;

a controller/timer interfaced to the pressure sensor and the electrically operated water shut-off valve, the controller/timer being operative to terminate the flow of water to the user location in the event that a drop in pressure is detected for longer than a predetermined period of time; and a user control center including a timer reset function operative to reset the timer and reestablish the flow of water through the water shut-off valve in the event that water usage beyond the preset period of time is intentional.

14. The water monitoring and control system according to claim 13, further including one or more user reset controls disposed remotely from the control center.

15. The water monitoring and control system according to claim 14, including at least one wirelessly activated remote user reset control.

16. The water monitoring and control system according to claim 13, wherein the user control center further includes an override control operative to extend the predetermined period of time in advance of an intended usage.

17. The water monitoring and control system according to claim 13, wherein the pressure sensor is disposed at a point between the water shut-off valve and the user location.

18. The water monitoring and control system according to claim 13, wherein the pressure sensor is a differential sensor disposed across the water shut-off valve.

* * * * *